United States Patent [19]

Ogata et al.

[11] Patent Number: 4,501,666
[45] Date of Patent: Feb. 26, 1985

[54] PROCESS FOR THE REMOVAL OF BISMUTH AND ANTIMONY FROM AQUEOUS SULFURIC ACID SOLUTION CONTAINING BISMUTH AND/OR ANTIMONY

[75] Inventors: Takashi Ogata; Hiroshi Hosaka; Shunichi Kasai, all of Toda, Japan

[73] Assignee: Nippon Mining Co., Ltd., Japan

[21] Appl. No.: 606,372

[22] Filed: May 2, 1984

[30] Foreign Application Priority Data

May 11, 1983 [JP] Japan ................................. 58-82402

[51] Int. Cl.³ .............................................. C25C 1/12
[52] U.S. Cl. ..................................... 210/688; 204/108
[58] Field of Search ........................ 210/688; 204/108

[56] References Cited

U.S. PATENT DOCUMENTS 4,046,688 9/1977 Cunningham et al. ............. 210/688
4,444,666 4/1984 Sato .................................... 210/688

FOREIGN PATENT DOCUMENTS 177420 10/1983 Japan .................................. 210/688

Primary Examiner—R. L. Andrews
Attorney, Agent, or Firm—McGlew and Tuttle

[57] ABSTRACT

Disclosed herein is a process for the selective removal of bismuth and/or antimony from an aqueous sulfuric acid solution containing dissolved bismuth and/or antimony mixed with other metals, such as an electrolyte formed in the electrolytic purification of metals, by which process bismuth and/or antimony are selectively removed from the above sulfuric acid solution by bringing said solution into contact with a phosphomethylamino chelate resin.

3 Claims, No Drawings

PROCESS FOR THE REMOVAL OF BISMUTH AND ANTIMONY FROM AQUEOUS SULFURIC ACID SOLUTION CONTAINING BISMUTH AND/OR ANTIMONY

BACKGROUND OF THE INVENTION

The present invention relates to a process for the selective removal of bismuth and/or antimony from a sulfuric acid solution in which bismuth and/or antimony are dissolved together with other metals.

In the purification and refining of nonferrous metals, it is unavoidable that a variety of metals are admixed into the product as impurities due to the diversity of ores used as raw materials. Among such impurities are also included bismuth and/or antimony. In particular, in the purification and refining of copper, it is substantially difficult to remove such impurities completely by the pyrometallurgical process. Accordingly, bismuth and/or anitomy, though small in quantity, are almost always contained in a copper anode and are submitted to a subsequent electrolytic purification step. Further, the electrolytic purification of copper is generally carried out in an aqueous sulfuric acid solution and thus part of the bismuth and/or antimony contained in the copper anode is dissolved into said aqueous solution during the electrolysis, with the result that the concentration thereof gradually increases. Moreover, the bismuth and/or antimony thus-dissolved deposit on a copper cathode in accordance with the increased concentration so that the concentration of bismuth and/or antimony is generally maintained at approximately 0.3-0.5 g/l in the aqueous sulfuric acid solution used as the electrolyte.

As a means of controlling the concentration of bismuth and/or antimony in the above aqueous sulfuric acid solution, there have been employed the neutralization method, the sulfiding method, the electrolytic collection method using an insoluble anode and the like, to which a portion of said aqueous solution (or copper electrolyte) removed from the system is submitted.

However, since the copper electrolyte generally contains approximately 200 g/l of free sulfuric acid, approximately 50 g/l of copper ion, approximately 5 g/l of arsenic, approximately 3 g/l of iron and the like, it has been difficult by the above methods to remove bismuth and/or antimony from said copper electrolyte in an efficient and selective manner.

The present inventors have made an intensive investigation into a process for the effective removal of only bismuth and/or antimony from an aqueous sulfuric acid solution containing dissolved bismuth and/or antimony, together with other metals, such as a copper electrolyte. As a result, it was found that bismuth and/or antimony were removed selectively from the above aqueous sulfuric acid solution by allowing said solution to contact with a phosphomethylamino chelate resin. The present invention has been completed on the basis of this discovery.

In this connection, a process (Japanese Patent Laid-Open No. 177420/1983, published on Oct. 18, 1983) has been proposed relating to the removal of indium from an aqueous acidic solution containing indium by allowing said aqueous solution to contact with an aminomethylenesulfonic acid derivative. However, no technique has been known for the selective removal of bismuth and/or antimony dissolved in an aqueous acidic solution using a phosphomethylamino chelate resin.

SUMMARY OF THE INVENTION

It is a principal object of the present invention to provide a process capable of removing bismuth and/or antimony in a selective and efficient manner from an aqueous sulfuric acid solution containing dissolved bismuth and/or antimony, together with other metals, such as a copper electrolyte.

Other objects of the present invention will become apparent from the description below.

The essential feature of the present invention is to remove bismuth and/or antimony selectively from an aqueous sulfuric acid solution dissolving bismuth and/or antimony mixed with other metals by contacting said aqueous sulfuric acid solution with a phosphomethylamine chelate resin.

DETAILED DESCRIPTION OF THE INVENTION

The aqueous sulfuric acid solution to be subjected to the process of the present invention is an aqueous sulfuric acid solution containing dissolved bismuth and/or antimony, together with other metals, such as a copper electrolyte. The solution generally contains metals such as copper, nickel, cobalt, iron, aresenic, manganese, zinc, calcium and the like in addition to bismuth and antimony.

The phosphomethylamino chelate resins used for the selective removal of bismuth and/or antimony from such an aqueous sulfuric acid solution according to the present invention are known per se in the art and are those having the structural formula shown by the following general formula and the metallic salts thereof;

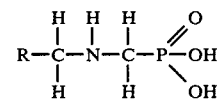

wherein R represents a high molecular hydrocarbon constituting the fundamental structure of the resin, for example, a styrenedivinylbenzene polymer.

The contact of the phosphomethylamino chelate resin with the above aqueous sulfuric acid solution can be carried out either by mixing under stirring or by means of a column as used with an ordinary ion-exchange resin in a batchwise or continuous manner. In practice, it is more efficient to effect the contact in a continuous manner.

Specific adjustment is not required for the concentration of sulfuric acid in the aqueous sulfuric acid solution in effecting the contact, since the concentration can be applied in a wide range. Moreover, the temperature at the time of the contact also does not need to be specifically controlled since the contact is effected satisfactorily at ambient temperature.

As described above, since the selective and efficient removal of bismuth and/or antimony dissolved in an aqueous sulfuric acid solution, which has been regarded as difficult, can be achieved according to the process of the present invention, the purification of, for example, a copper electrolyte and the like can be effectively performed.

The effects of the present invention will be explained concretely by reference to the examples as follows:

EXAMPLE 1

50 ml of an aqueous sulfuric acid solution having the composition shown in the Table 1 below and 10 ml of a phosphomethylamino chelate resin of the hydrogen type (a chelate resin of the above general formula wherein R is a styrenedivinylbenzene polymer) were placed in a beaker and stirred gently for 2.5 hours at 18° C. to effect the contact uniformly. Thereafter, the resultant mixture was subjected to filtration, and the ions in the filtrate were analyzed. The results are as shown in Table 1.

TABLE 1

| Sample | Composition Analysis (g/l) | | | | | | |
|---|---|---|---|---|---|---|---|
| | Bi | Sb | Cu | Fe | As | Ni | $H_2SO_4$ |
| Aqueous sulfuric acid solution | 0.31 | 0.30 | 14 | 2.8 | 8.1 | 8.1 | 396 |
| Filtrate after contact with resin | 0.16 | 0.07 | 13 | 2.0 | 7.2 | 7.4 | 360 |

As can be seen in the Table, bismuth and antimony were removed in a selective and efficient manner.

EXAMPLE 2

Aqueous sulfuric acid solutions having the compositions shown in the Tables 2 and 3 below were submitted to contacting treatment in the same manner as described in Example 1 and an analysis of the filtrate was also made in the same manner. The results are as shown in Tables 2 and 3.

TABLE 2

| Sample | Composition Analysis (g/l) | | | | | | |
|---|---|---|---|---|---|---|---|
| | Bi | Sb | Cu | Fe | As | Ni | $H_2SO_4$ |
| Aqueous sulfuric acid solution | 0.33 | 0.28 | 35 | 3.3 | 8.2 | 7.2 | 190 |
| Filtrate after contact with resin | 0.15 | 0.06 | 31 | 2.9 | 7.2 | 6.4 | 170 |

TABLE 3

| Sample | Composition Analysis (g/l) | | | | | | |
|---|---|---|---|---|---|---|---|
| | Bi | Sb | Cu | Fe | As | Ni | $H_2SO_4$ |
| Aqueous sulfuric acid solution | 0.28 | 0.25 | 50 | 3.0 | 8.3 | 5.8 | 43 |
| Filtrate after contact with resin | 0.16 | 0.08 | 46 | 2.6 | 6.1 | 5.3 | 39 |

As can be seen in the Tables, bismuth and antimony were removed in a selective and efficient manner.

EXAMPLE 3

An aqueous sulfuric acid solution having the composition shown in Table 4 below was passed through a column packed with 40 ml of a phosphomethylamino chelate resin of the hydrogen type used in Example 1 at a temperature of 50° C. as a starting solution. The solution passed through the column was sampled and analyzed at predetermined intervals. The results are as shown in Table 4.

TABLE 4

| Sample | Composition Analysis (g/l) | | | | | |
|---|---|---|---|---|---|---|
| | Bi | Sb | Cu | Fe | As | $H_2SO_4$ |
| Starting solution | 0.30 | 0.30 | 34.2 | 2.6 | 8.3 | 195 |
| Solution after 3 hours passage | <0.01 | <0.02 | 34.0 | 2.1 | 8.2 | 190 |
| Solution after 5 hours passage | <0.01 | <0.02 | 34.2 | 2.2 | 8.3 | — |
| Solution after 9 hours passage | <0.01 | <0.02 | — | 2.2 | 8.3 | 200 |

As can be seen in Table 4, bismuth and antimony were selectively and efficiently removed from said solution.

What we claim is:

1. A process for the selective removal of bismuth and/or antimony from an aqueous sulfuric acid solution containing dissolved bismuth and/or antimony mixed with other metals comprising bringing said sulfuric acid solution into contact with a phosphomethylamino chelate resin.

2. A process according to claim 1 wherein said aqueous sulfuric acid solution is a copper electrolyte.

3. A process according to claim 1 wherein the phosphomethylamino chelate resin is composed of a styrenedivinylbenzene polymer as a fundamental structure.

* * * * *